Figure 1:
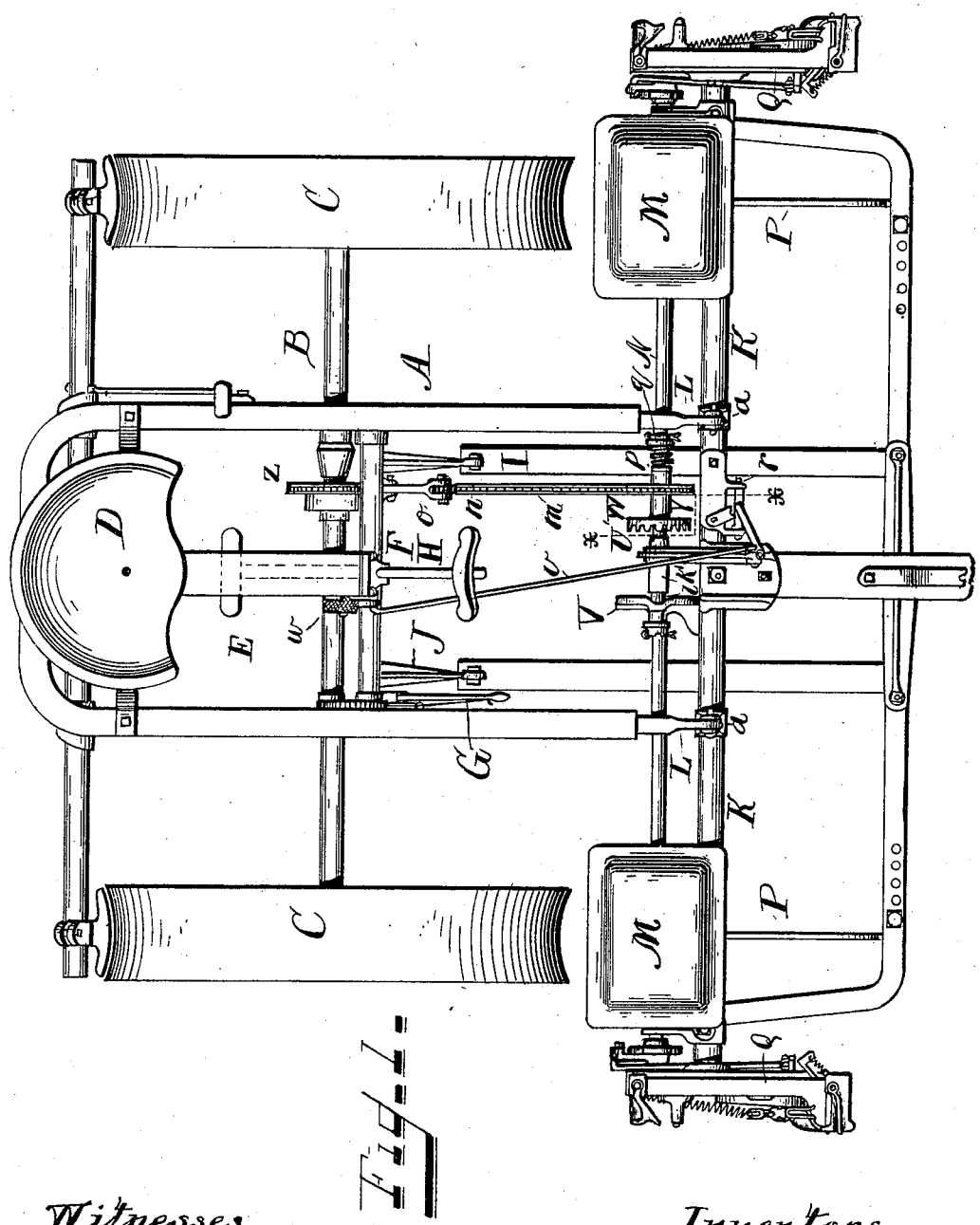

(No Model.) 2 Sheets—Sheet 1.

A. F. BROWN & C. W. MICHAEL.
CORN PLANTER.

No. 578,075. Patented Mar. 2, 1897.

Witnesses
Bernard J. Hausfeld.
Ferdinand W. Kylius.

Inventors
Arthur F. Brown
Clement W. Michael
by Chas. M. Beck
their Attorney.

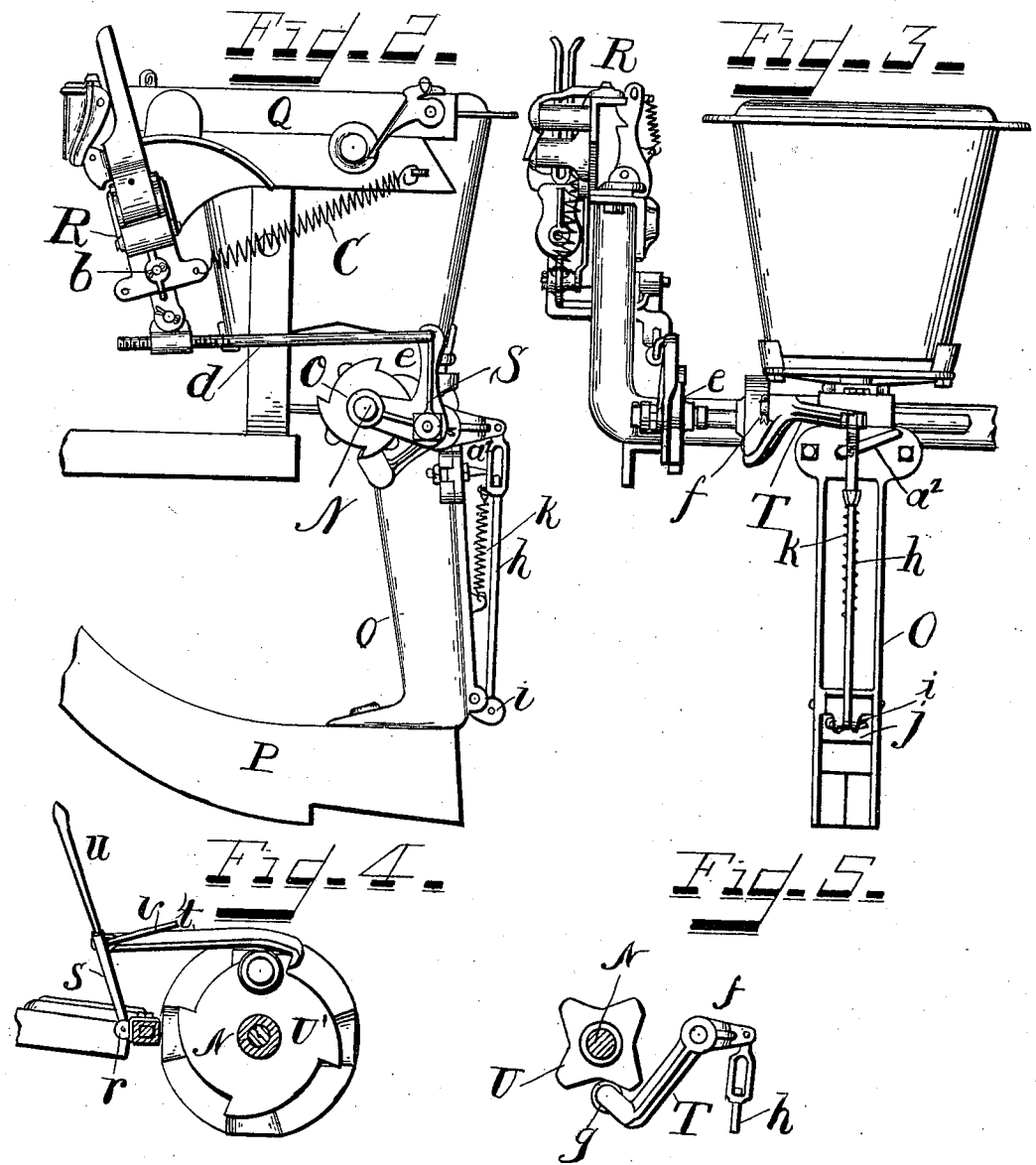

UNITED STATES PATENT OFFICE.

ARTHUR F. BROWN AND CLEMENT W. MICHAEL, OF DAYTON, OHIO, ASSIGNORS TO THE STODDARD MANUFACTURING COMPANY, OF SAME PLACE.

CORN-PLANTER.

SPECIFICATION forming part of Letters Patent No. 578,075, dated March 2, 1897.

Application filed July 5, 1895. Serial No. 555,038. (No model.)

*To all whom it may concern:*

Be it known that we, ARTHUR F. BROWN and CLEMENT W. MICHAEL, citizens of the United States, residing at Dayton, in the county of Montgomery and State of Ohio, have invented certain new and useful Improvements in Corn-Planters, of which the following is a full, clear, and exact description, reference being had to the accompanying drawings, forming part of this specification.

Our invention relates to that class of corn-planters having a main wheel-frame, to which are hinged or jointed a forward runner and seed frame, and has for its object the provision of means whereby the traction of the machine is applied rotatively to the feed-shaft at such intervals as are desired either by automatic check-row mechanism from one point, by hand mechanism from another point, or by the foot of the driver of the machine from another point; also, in the provision of means whereby the feed-shaft may be continuously rotated by the traction of the machine and whereby the planter may be used as a drill, a drill-dropper, or a hill-dropper, according to the preference of the operator.

The novelty of our invention will be hereinafter set forth, and specifically pointed out in the claims.

In the accompanying drawings, Figure 1, Sheet 1, is a plan view of a corn-planter embodying our invention. Fig. 2, Sheet 2, is an enlarged side elevation, partly broken away, of the runner-frame and mechanism carried thereby. Fig. 3, Sheet 2, is a rear elevation of Fig. 2. Fig. 4, Sheet 2, is an enlarged sectional detail on the dotted line $x\,x$ of Fig. 1, looking toward the bottom of the sheet. Fig. 5, Sheet 2, is an enlarged detail of Fig. 3, looking to the right.

The same letters of reference are used to indicate identical parts in all the figures.

In Fig. 1, A is the main frame, to which is journaled the axle B, carried and revolved by the ground-wheels C. D is the driver's seat, whose bow E is carried on the transverse rock-shaft F, journaled upon the main frame A, and which is actuated by a hand lock-lever G or by a foot-lever H to raise or depress the runners and runner-frame, whose hounds I are pivotally connected to arms J, extending from the rock-shaft F. All these parts may be of the usual or any suitable construction and, being well known, need not be further described.

The main frame is coupled by hinged joints to the runner-frame A through means of curved arms L, projecting from the forward ends of the main frame A and bent downward, with perforated ends pivoted between lugs $a$ on the runner-frame. The runner-frame carries the usual or any suitable hoppers M for the corn, provided with the usual or any suitable dropping-plates actuated by a shaft N, carried thereby and suitably journaled under the hoppers. The dropping-plates communicate with the shanks or spouts O, carried on the rear of the runners P.

The check-row heads Q are secured upon the upturned ends of the bar K of the runner-frame and have pivoted thereto, as at $b$, the wire-actuated forks R, held normally forward by a coiled spring $c$. The lower end of each fork is connected by an adjustable link $d$ with the upper arm of a bell-crank S, hung loose upon the shaft N by the side of a ratchet O, fast on said shaft, and the bell-crank carries a pivoted dog $e$, Figs. 2 and 3, to engage the ratchet O and partially turn the same forward when either of the check-row forks is drawn back by the action of the wire. Pivoted, as at $f$, Figs. 3 and 5, to the shanks O under each hopper is a bell-crank arm T, whose forward end, preferably provided with a roller $g$, engages a tappet-wiper U, fast on the shaft N. The opposite end of said bell-crank is connected by an adjustable link $h$ to lugs $i$, projecting from the valves $j$, pivoted in the lower ends of the shanks or spouts O. A coiled spring $k$, connected at one end to the link $h$ and at its other end to the shank, serves to hold each valve normally closed. Fast on the feed-shaft N is a ratchet-disk U', Figs. 1 and 4, with, in this instance, four teeth and carrying a transversely-set housing $k'$, in which is confined and guided a dog or lock-bolt $l$, normally held projected toward a fixed flat disk V, carried by the bar K by a coiled spring, as shown and described in our pending application filed concurrently with this.

Adjacent to the ratchet U′, loose on the shaft N, is a crown-gear W, carrying on its hub a sprocket-wheel Y, constantly driven by a traction of the machine forward, in this instance from a sprocket-wheel Z on the axle B and a connecting drive-chain $m$, held permanently taut by an idler-sprocket $n$, pivoted to an arm $o$, which is pivoted to the shaft F, Fig. 1. The sprocket Y and gear W are held constantly toward the ratchet U′ by a spring $p$, coiled around the shaft N and bearing against the hub of the sprocket Y, and a washer $q$, fast on the shaft N, as seen in Fig. 1.

Pivoted, as at $r$, to the runner-frame, Figs. 1 and 4, is a lever $s$, having pivoted thereto the forward end of a dog $t$, engaging the ratchet U′, and said lever is provided with a handle $u$ in convenient reach of the driver's seat (not shown) for actuating the dog by hand to start the ratchet and lock it to the gear W by forcing the dog or bolt $l$ out of a depression in the disk V and into engagement with the gear W, as described in our aforesaid application and as will be readily understood.

A link $v$, Figs. 1 and 4, has its forward end pivoted to the lever $s$ and its rear end to a foot-treadle $w$ in convenient reach of the driver on his seat D in such manner that by pressing upon said treadle with his foot he can press the lever $s$ forward and cause the ratchet U′ to move forward sufficiently to take its dog out of a depression in the disk V and to lock it to the revolving gear W.

It will thus be seen from the foregoing and from the adjustment of the parts that the first essential movement is a partial rotation of the shaft N, which may be imparted either by the check-row fork, through the medium of the dog $e$ and ratchet O, or by hand by the dropper on his seat, through the medium of the lever S, or by the driver with his foot on the pedal $w$, the two latter movements causing the dog $t$, acting on the ratchet U′, to start the shaft N forward and to lock it to the gear W, and these initial movements first open the valves $j$ to let out the grain deposited thereon by the prior action of the seed-dropping mechanism, and which valves are closed again by the springs $k$, and then by the engagement of the dog carried by the ratchet U′ with the gear-wheel W the seed-dropping mechanism is set into motion and does its work of depositing a fresh charge into the spouts, and the parts come to rest when the dog $l$ comes opposite the next depression in the disk V and remains so until the shaft N is started forward again by either of the foregoing instrumentalities, and so on, as will be readily understood.

When it is desired to use the machine for continuous drilling, we have provided pivoted latches $a^2$ under each hopper, Figs. 2 and 3, which, when the links $h$ are pulled upward to open the valves $j$, engage under each of the crank-arms T to hold said valves permanently open, and we lock the dog $l$ into enagement with the gear W by means of a pin passed through the housing and dog, as in our application before referred to.

The gear W and the dog $l$, carried by the ratchet U′, form a simple and efficient clutch mechanism for locking the feed-shaft to the revolving parts of the machine, but our invention is not to be restricted to this form of clutch mechanism alone.

Having thus fully described our invention, we claim—

1. In a corn-planter and in combination, seed-spouts, seeding mechanism for depositing the seed in the spouts, check-row mechanism, a revolving member constantly driven by the traction of the machine, a single shaft connected at its ends to said check-row mechanism and to the seeding mechanism, and a clutch controlled by the check-row mechanism for locking said shaft to the constantly-revolving member at predetermined intervals, substantially as described.

2. In a corn-planter and in combination, seed-spouts with valves therein, seeding mechanism for depositing the seed in the spouts, check-row mechanism, a revolving member constantly driven by the traction of the machine, a single shaft connected at its ends to said check-row mechanism, seeding mechanism, and the valves in the spouts, and a clutch controlled by the check-row mechanism for locking said shaft to the constantly-revolving member at predetermined intervals, substantially as described.

3. In a corn-planter, the combination of the runner-frame carrying seed-dropping mechanism with valves in the spouts, a rotatable feed-shaft for actuating said seed-dropping mechanism and valves, a wheel thereon revolved by the machine, clutch mechanism adjacent thereto, and mechanism within reach of the driver's foot for coupling said clutch mechanism to the revolving wheel to actuate the valves and dropping mechanism, substantially as described.

4. In a corn-planter, the combination of the runner-frame carrying seed-dropping mechanism with valves in the spouts, a rotatable feed-shaft for actuating said seed-dropping mechanism and valves, a wheel thereon revolved by the machine, clutch mechanism adjacent thereto, and automatic check-row mechanism connected to the ends of said shaft for coupling said clutch mechanism to the revolving wheel to actuate the dropping mechanism, substantially as described.

5. In a corn-planter, the combination of the runner-frame carrying seed-dropping mechanism with valves in the spouts, a rotatable feed-shaft for actuating said seed-dropping mechanism and valves, a wheel thereon revolved by the machine, clutch mechanism adjacent thereto, foot-actuating means for said clutch mechanism, and automatic check-row mechanism for coupling said clutch mechanism to the revolving wheel to actuate the dropping mechanism, substantially as described.

6. In a corn-planter, the combination of the runner-frame carrying seed-dropping mechanism with valves in the spouts, a rotatable feed-shaft for actuating said seed-dropping mechanism and valves, ratchet mechanism for said shaft coupled to check-row forks, tappet-wipers on said shaft engaging cranks connected to said valves, a wheel on said shaft revolved by the machine, and clutch mechanism adjacent thereto with means for coupling said clutch mechanism to the revolving wheel upon the partial rotation of the shaft, substantially as described.

7. In a corn-planter, the combination of the rotatable feed-shaft, N, connected to the dropping mechanism and the valves in the spouts, a constantly-revolving clutch-wheel as, W, thereon, a ratchet fast on said shaft adjacent to the clutch-wheel and carrying a locking-dog, a fixed disk, as V, with depressions for causing the engagement and disengagement of the clutch mechanism, a lever pivoted to the runner-frame, and a dog carried on said lever engaging the ratchet, substantially as described.

ARTHUR F. BROWN.
CLEMENT W. MICHAEL.

Witnesses:
WARREN HALL,
J. F. CAMPBELL.